US008505362B2

(12) United States Patent
Sweeney et al.

(10) Patent No.: US 8,505,362 B2
(45) Date of Patent: Aug. 13, 2013

(54) METHOD FOR PIPELINE CONDITIONING

(75) Inventors: Alan Sweeney, Houston, TX (US); Brian Hallett, San AnStonio, TX (US)

(73) Assignee: Clearwater International LLC, Houston, TX (US)

( * ) Notice: Subject to any disclaimer, the term of this patent is extended or adjusted under 35 U.S.C. 154(b) by 0 days.

(21) Appl. No.: 13/295,211

(22) Filed: Nov. 14, 2011

(65) Prior Publication Data

US 2012/0055575 A1 Mar. 8, 2012

Related U.S. Application Data

(62) Division of application No. 11/767,384, filed on Jun. 22, 2007, now Pat. No. 8,065,905.

(51) Int. Cl.
*G01M 3/02* (2006.01)
*C23G 3/04* (2006.01)

(52) U.S. Cl.
USPC .......... 73/49.5

(58) Field of Classification Search
USPC .......... 73/49.5; 134/8
See application file for complete search history.

(56) References Cited

U.S. PATENT DOCUMENTS

| | | | |
|---|---|---|---|
| 2,196,042 | A | 4/1940 | Timpson |
| 2,390,153 | A | 12/1945 | Kern |
| 3,059,909 | A | 10/1962 | Wise |
| 3,163,219 | A | 12/1964 | Wyant et al. |
| 3,301,723 | A | 1/1967 | Chrisp |
| 3,301,848 | A | 1/1967 | Halleck |
| 3,303,896 | A | 2/1967 | Tillotson et al. |
| 3,317,430 | A | 5/1967 | Priestley et al. |
| 3,565,176 | A | 2/1971 | Wittenwyler |
| 3,856,921 | A | 12/1974 | Shrier et al. |
| 3,888,312 | A | 6/1975 | Tiner et al. |
| 3,933,205 | A | 1/1976 | Kiel |
| 3,937,283 | A | 2/1976 | Blauer et al. |
| 3,960,736 | A | 6/1976 | Free et al. |
| 3,965,982 | A | 6/1976 | Medlin |
| 3,990,978 | A | 11/1976 | Hill |
| 4,007,792 | A | 2/1977 | Meister |

(Continued)

FOREIGN PATENT DOCUMENTS

| | | |
|---|---|---|
| CA | 2125513 | 1/1995 |
| CA | 2007965 | 2/1996 |

(Continued)

OTHER PUBLICATIONS

Fadnes F H et al: "Studies on the prevention of gas hydrates formation in pipelines USing Potassium Formales as a thermodynamic inhibitor", Proceedings of the European Petroleum conference, vol. 2, Oct. 20, 1998, pp. 497-506.

*Primary Examiner* — Daniel Larkin
(74) *Attorney, Agent, or Firm* — Robert W Strozier

(57) ABSTRACT

Method for dewatering, pressure testing, hydrotreating, suppressing methane hydrate formation and suppressing solution freezing point in pipeline operations have been disclosed, where the solution used in the operations includes an effective amount of a metal formate salt. The metal formate salt solutions have a low viscosity, have a high density, have a low metals corrosivity, are non-volatile, have a low solubility in hydrocarbons, are readily biodegradable, have a low toxicity, are non-hazardous, have a low environmental impact, have a freezing point depression property forming water/formate eutectic point mixtures, and have a water-structuring and water activity modification property.

11 Claims, 5 Drawing Sheets

Hydrate Suppression Using Potassium Formate Solution, Methanol, and Ethylene Glycol

(56) References Cited

U.S. PATENT DOCUMENTS 4,052,159 A 10/1977 Fuerst et al.
4,067,389 A 1/1978 Savins
4,108,782 A 8/1978 Thompson
4,112,050 A 9/1978 Sartori et al.
4,112,051 A 9/1978 Sartori et al.
4,112,052 A 9/1978 Sartori et al.
4,113,631 A 9/1978 Thompson
4,378,845 A 4/1983 Medlin et al.
4,461,716 A 7/1984 Barbarin et al.
4,479,041 A 10/1984 Fenwick et al.
4,506,734 A 3/1985 Nolte
4,514,309 A 4/1985 Wadhwa
4,541,935 A 9/1985 Constien et al.
4,549,608 A 10/1985 Stowe et al.
4,561,985 A 12/1985 Glass, Jr.
4,623,021 A 11/1986 Stowe
4,654,266 A 3/1987 Kachnik
4,657,081 A 4/1987 Hodge
4,660,643 A 4/1987 Perkins
4,683,068 A 7/1987 Kucera
4,686,052 A 8/1987 Baranet et al.
4,695,389 A 9/1987 Kubala
4,705,113 A 11/1987 Perkins
4,714,115 A 12/1987 Uhri
4,718,490 A 1/1988 Uhri
4,724,905 A 2/1988 Uhri
4,725,372 A 2/1988 Teot et al.
4,739,834 A 4/1988 Peiffer et al.
4,741,401 A 5/1988 Walles et al.
4,748,011 A 5/1988 Baize
4,779,680 A 10/1988 Sydansk
4,795,574 A 1/1989 Syrinek et al.
4,817,717 A 4/1989 Jennings, Jr. et al.
4,830,106 A 5/1989 Uhri
4,846,277 A 7/1989 Khalil et al.
4,848,468 A 7/1989 Hazlett et al.
4,852,650 A 8/1989 Jennings, Jr. et al.
4,869,322 A 9/1989 Vogt, Jr. et al.
4,892,147 A 1/1990 Jennings, Jr. et al.
4,926,940 A 5/1990 Stromswold
4,938,286 A 7/1990 Jennings, Jr.
4,978,512 A 12/1990 Dillon
5,005,645 A 4/1991 Jennings, Jr. et al.
5,024,276 A 6/1991 Borchardt
5,067,556 A 11/1991 Fudono et al.
5,074,359 A 12/1991 Schmidt
5,074,991 A 12/1991 Weers
5,082,579 A 1/1992 Dawson
5,106,518 A 4/1992 Cooney et al.
5,110,486 A 5/1992 Manalastas et al.
5,169,411 A 12/1992 Weers
5,224,546 A 7/1993 Smith et al.
5,228,510 A 7/1993 Jennings, Jr. et al.
5,246,073 A 9/1993 Sandiford et al.
5,259,455 A 11/1993 Nimerick et al.
5,330,005 A 7/1994 Card et al.
5,342,530 A 8/1994 Aften et al.
5,347,004 A 9/1994 Rivers et al.
5,363,919 A 11/1994 Jennings, Jr.
5,402,846 A 4/1995 Jennings, Jr. et al.
5,411,091 A 5/1995 Jennings, Jr.
5,424,284 A 6/1995 Patel et al.
5,439,055 A 8/1995 Card et al.
5,462,721 A 10/1995 Pounds et al.
5,465,792 A 11/1995 Dawson et al.
5,472,049 A 12/1995 Chaffee et al.
5,482,116 A 1/1996 El-Rabaa et al.
5,488,083 A 1/1996 Kinsey, III et al.
5,497,831 A 3/1996 Hainey et al.
5,501,275 A 3/1996 Card et al.
5,551,516 A 9/1996 Norman et al.
5,624,886 A 4/1997 Dawson et al.
5,635,458 A 6/1997 Lee et al.
5,649,596 A 7/1997 Jones et al.
5,669,447 A 9/1997 Walker et al.
5,674,377 A 10/1997 Sullivan, III et al.
5,688,478 A 11/1997 Pounds et al.
5,693,837 A 12/1997 Smith et al.
5,711,396 A 1/1998 Joerg et al.
5,722,490 A 3/1998 Ebinger
5,744,024 A 4/1998 Sullivan, III et al.
5,755,286 A 5/1998 Ebinger
5,775,425 A 7/1998 Weaver et al.
5,787,986 A 8/1998 Weaver et al.
5,806,597 A 9/1998 Tjon-Joe-Pin et al.
5,807,812 A 9/1998 Smith et al.
5,833,000 A 11/1998 Weaver et al.
5,846,450 A * 12/1998 Atkinson ........................ 252/69
5,853,048 A 12/1998 Weaver et al.
5,871,049 A 2/1999 Weaver et al.
5,877,127 A 3/1999 Card et al.
5,908,073 A 6/1999 Nguyen et al.
5,908,814 A 6/1999 Patel et al.
5,964,295 A 10/1999 Brown et al.
5,979,557 A 11/1999 Card et al.
5,980,845 A 11/1999 Cherry
6,016,871 A 1/2000 Burts, Jr.
6,035,936 A 3/2000 Whalen
6,047,772 A 4/2000 Weaver et al.
6,054,417 A 4/2000 Graham et al.
6,059,034 A 5/2000 Rickards et al.
6,060,436 A 5/2000 Snyder et al.
6,069,118 A 5/2000 Hinkel et al.
6,123,394 A 9/2000 Jeffrey
6,133,205 A 10/2000 Jones
6,147,034 A 11/2000 Jones et al.
6,162,449 A 12/2000 Maier et al.
6,162,766 A 12/2000 Muir et al.
6,169,058 B1 1/2001 Le et al.
6,228,812 B1 5/2001 Dawson et al.
6,247,543 B1 6/2001 Patel et al.
6,267,938 B1 7/2001 Warrender et al.
6,283,212 B1 9/2001 Hinkel et al.
6,291,405 B1 9/2001 Lee et al.
6,330,916 B1 12/2001 Rickards et al.
6,725,931 B2 4/2004 Nguyen et al.
6,756,345 B2 6/2004 Pakulski et al.
6,793,018 B2 9/2004 Dawson et al.
6,832,650 B2 12/2004 Nguyen et al.
6,875,728 B2 4/2005 Gupta et al.
6,896,718 B2 * 5/2005 Hallman ......................... 95/231
7,093,655 B2 8/2006 Atkinson
7,140,433 B2 11/2006 Gatlin et al.
7,268,100 B2 9/2007 Kippie et al.
7,350,579 B2 4/2008 Gatlin et al.
7,565,933 B2 7/2009 Kippie et al.
7,712,535 B2 5/2010 Venditto et al.
7,829,510 B2 11/2010 Gatlin et al.
7,989,404 B2 8/2011 Kakadjian et al.
7,992,653 B2 8/2011 Zamora et al.
8,034,750 B2 10/2011 Thompson et al.
8,065,905 B2 11/2011 Sweeney et al. ............... 73/49.5
8,084,401 B2 12/2011 Lukocs et al.
8,158,562 B2 4/2012 Wilson, Jr. et al.
8,172,952 B2 5/2012 Wanner et al.
2002/0049256 A1 4/2002 Bergeron, Jr.
2002/0056828 A1 * 5/2002 Hallman ......................... 252/69
2002/0129641 A1 * 9/2002 Tucker et al. .................. 73/49.5
2002/0165308 A1 11/2002 Kinniard et al.
2003/0220204 A1 11/2003 Baran, Jr. et al.
2004/0198611 A1 10/2004 Atkinson
2005/0045330 A1 3/2005 Nguyen et al.
2005/0092489 A1 5/2005 Welton et al.
2005/0137114 A1 6/2005 Gatlin et al.
2005/0153846 A1 7/2005 Gatlin
2005/0250666 A1 11/2005 Gatlin et al.
2006/0194700 A1 8/2006 Gatlin et al.
2007/0003371 A1 * 1/2007 Yemington ................ 405/154.1
2007/0032693 A1 2/2007 Gatlin et al.
2007/0129257 A1 6/2007 Kippie et al.
2007/0131425 A1 6/2007 Gatlin et al.
2007/0173414 A1 7/2007 Wilson, Jr.

| | | | |
|---|---|---|---|
| 2008/0039345 | A1 | 2/2008 | Kippie et al. |
| 2008/0251252 | A1 | 10/2008 | Schwartz |
| 2008/0318812 | A1 | 12/2008 | Kakadjian et al. |

FOREIGN PATENT DOCUMENTS

| | | | | |
|---|---|---|---|---|
| DE | 4027300 | | | 5/1992 |
| EP | 0730018 | A1 | | 9/1996 |
| GB | 775376 | | | 10/1954 |
| GB | 816337 | A | | 7/1959 |
| GB | 1073338 | A | | 6/1967 |
| JP | 10001461 | | | 6/1988 |
| JP | 08151422 | | | 11/1996 |
| JP | 10110115 | A | | 4/1998 |
| JP | 2005194148 | A | | 7/2005 |
| WO | WO 98/19774 | | | 5/1998 |
| WO | WO 98/56497 | | | 12/1998 |
| WO | WO 02/096574 | | * | 12/2002 |

* cited by examiner

METHOD FOR PIPELINE CONDITIONING

RELATED APPLICATIONS

This application is divisional application, claiming priority to and the benefit of, U.S. patent application Ser. No. 11/767,384 filed Jun. 22, 2007 (22 Jun. 2001).

BACKGROUND OF THE INVENTION

1. Field of the Invention

The present invention relates to a method and a use of an aqueous, metal ion formate salt composition for reducing a residual water film on an interior of a pipeline during pipeline dewatering operations, which may involve the use of a pig or a plurality of pigs, for pipeline pressure testing operations, for freezing pointing suppression for sub-freezing temperature pipeline testing operations, i.e., operation at temperatures below 0° C.

More particularly, the present invention relates to a method and a use of an aqueous metal ion formate salt composition for pipeline operations. The method includes the step of contacting an interior of a pipeline with an effective amount of an aqueous metal ion formate salt composition, where the effective amount is sufficient to reduce substantially all or part of a residual water film from the interior of the pipeline during a dewatering operation. The metal ion formate salt composition includes a concentration of metal ion formate salt sufficient to dilute a water concentration of a residual film in a pipeline formed during a dewatering operation, where the dewatering operation may involve the use of a pig or multiple pigs. The present invention also relates to a method and a use of an aqueous metal ion formate salt composition in pipeline pressure testing operations. In sub-freezing point operations, the composition includes an amount of the metal ion formate salt sufficient to suppress a freezing point of fluid during repair and/or pressure testing operations to a desired temperature below a freezing point of ordinary water. The present invention also relates to a method and a use of an aqueous metal ion formate salt composition in all other sub-freezing temperature operations, including wet hydrocarbon transmission in sub-freezing temperature environments.

2. Description of the Related Art

Large volumes of methanol and glycol are routinely injected into gas transport pipelines to inhibit the formation of gas hydrates. These chemicals are derived from hydrocarbons and pose a potential environmental risk for the user. Companies commonly apply conditioning agents such as these for pipeline pre-commissioning operations.

Thermodynamic gas hydrate inhibitors are widely used for a number of applications. They essentially reduce the equilibrium temperature of hydrate formation by acting on the chemical potential of water in the aqueous phase. Chemicals such as methanol and glycol which fall into this category are generally dosed at relatively high concentrations (10-15% w/w) in the aqueous phase. Methanol is, on mass basis the most efficient of the conventional thermodynamic hydrate inhibitors. It is cheap and readily available, but it is a volatile chemical and losses of the inhibitor to the hydrocarbon phase can be considerable. In addition, the handling of methanol is complicated by its toxicity and flammability. While ethylene glycols are far less flammable, and their losses in the hydrocarbon phase are lower, they possess similar toxicity issues.

Despite the widespread use of brines in drilling fluids as gas hydrate inhibitors they are rarely used in pipelines. This is because conventional brines are corrosive, prone to crystallization and generally less effective than either methanol or glycol.

Pipelines that are used for transportation of hydrocarbon gases should be free of water. There are various reasons for this including: (1) prevention of hydrate formation, (1) prevention or reduction of corrosion, and (3) meeting gas sale specifications. Newly constructed pipelines are typically hydrotested; it is, therefore, necessary to dewater and condition the pipeline. This often involves the use of "conditioning" chemicals such as ethylene glycol or other similar glycols or methanol. These chemicals present the industry with certain toxicity problems, which prevents them from being discharged into marine environments. Further, methanol presents another problem; it is highly flammable in air.

Thus, there is a need in the art for an improved system and method for dewatering and conditioning pipelines and for a new fluid for use in repair and pressure testing at temperatures below the freezing point of pure water, which are environmentally friendly and have similar thermodynamic hydrate inhibition properties and similar freezing point suppressant properties compared to methanol and glycols.

SUMMARY OF THE INVENTION

The present invention provides an improved system for dewatering and conditioning pipelines, where the system includes an aqueous composition comprising an effective amount of a metal ion formate salt, where the effective amount is sufficient to reduce an amount of bulk water and/or an amount of residual water in the pipeline, to reduce an amount of a residual water film in a pipeline below a desired amount or to remove substantially all of the residual water in the pipeline.

The present invention also provides a method for dewatering a pipeline including the step of pumping an aqueous composition comprising an effective amount of metal ion formate salt, where the effective amount is sufficient to reduce an amount of a residual water film in the pipeline, to reduce an amount of the residual water film in a pipeline below a desired amount or to remove substantially the residual water film in the pipeline. The method can also include the step of pumping the spent solution into a marine environment without pretreatment. The method can also include the step of pressure testing the pipeline with an aqueous fluid including a metal ion formate salt in a concentration sufficient to reduce or eliminate hydrate formation after pressuring testing and during initial hydrocarbon production. In sub-freezing point operation, the concentration of the metal ion formate salt is sufficient to lower the freezing point of the fluid to a desired temperature below the freezing point of pure water so that the pressure testing or hydrotesting can be performed when the ambient temperature is below the freezing point of pure water (a sub-freezing temperature) without a concern for having to clean up material lost from leaks.

The present invention also provides a method for pressure testing a pipeline including the step of filling a pipeline or a portion thereof with an aqueous composition including a metal ion formate salt, where the composition is environmentally friendly, i.e., capable of being released into a body of water without treatment. The method is especially well suited for pressuring testing a pipeline at sub-freezing temperatures, where an effective amount of the metal ion formate salt is added to the aqueous composition to depress the composition's freezing point temperature to a temperature below the operating temperature, where operating temperature is below the freezing point of pure water.

The present invention also provides a method for installing a pipeline including the step of filling a pipeline with an aqueous metal ion formate salt composition of this invention. After the pipeline is filled, the pipeline is laid, either on a land site or a subsea site. After laying the pipeline, the pipeline is pressurized using an external water source. After pressure testing, the pipeline is brought on production by displacing the composition and the pressuring external water, which can be discharged without treatment. In certain embodiments, the pipeline is laid subsea and the pressurizing external water is seawater, where the composition and pressurizing seawater are discharged into the sea as it is displaced by production fluids. By using the composition of this invention, hydrate formation is precluded during the composition displacement operation. In certain embodiments, the pressure testing is performed at a pressure that is a percentage of the maximum allowable operating pressure or a specific percentage of the pipeline design pressure. In other embodiments, the pressure testing is performed at a pressure between about 1.25 and about 1.5 times the operating pressure. Of course, an ordinary artisan would understand that the pressure testing can be at any desired pressure.

BRIEF DESCRIPTION OF THE DRAWINGS

The invention can be better understood with reference to the following detailed description together with the appended illustrative drawings in which like elements are numbered the same.

DEFINITIONS USED IN THE INVENTION

Figure 1:
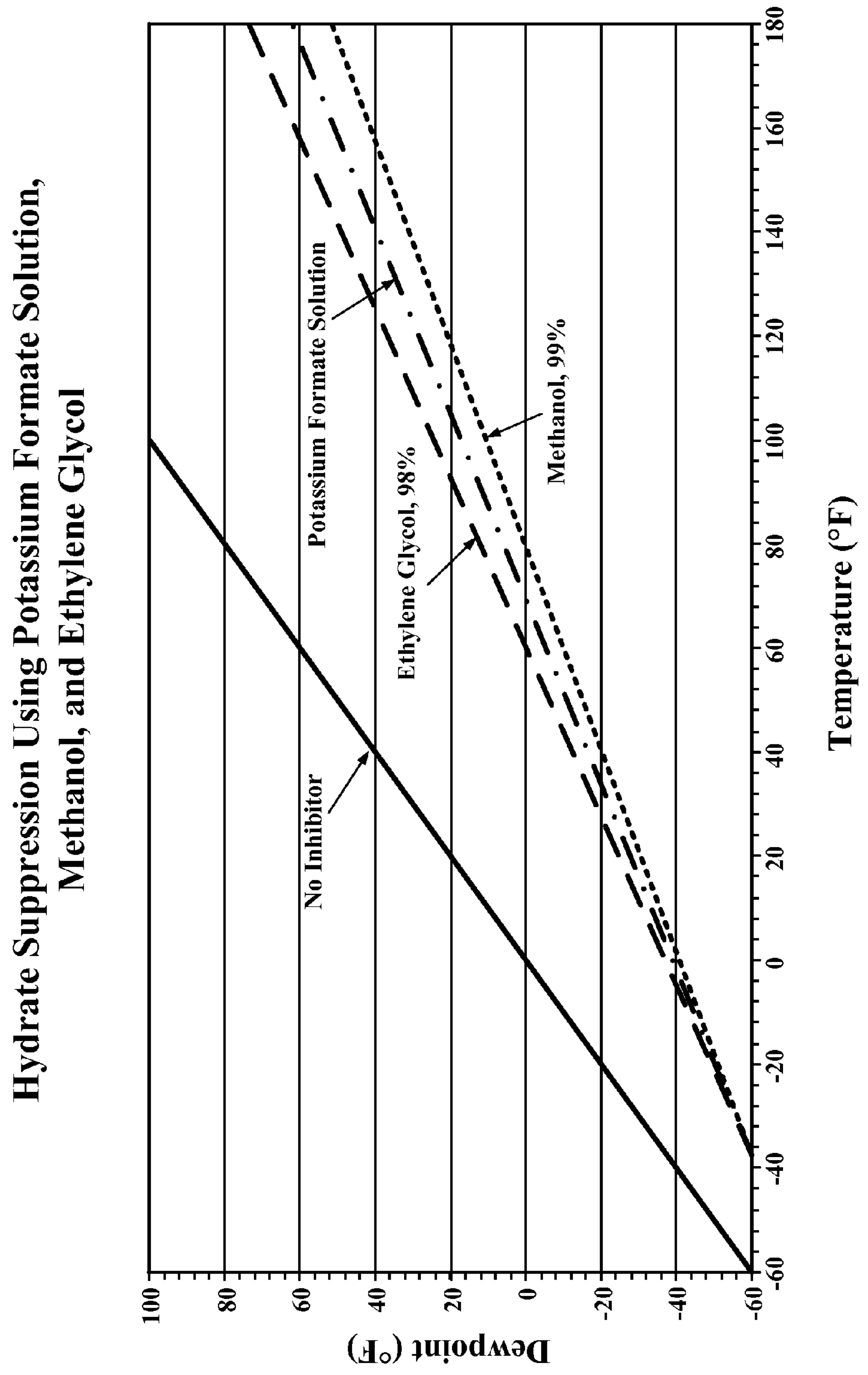
FIG. 1 depicts a plot of hydrate suppression of a potassium formate solution of this invention compared to a methanol solution and an ethylene glycol solution.

The term "substantially" means that the actual value is within about 5% of the actual desired value, particularly within about 2% of the actual desired value and especially within about 1% of the actual desired value of any variable, element or limit set forth herein.

The term "residual film" means a water film left in a pipeline after a pig bulk dewatering operation. For carbon steel pipelines, a water residual film of about 0.1 mm is left in the pipeline. The present composition is used to change the make up of the residual film coating the pipeline to a film having at least 70% w/w of the aqueous, metal ion formate salt composition of this invention and 30% w/w residual water. In certain embodiments, the residual film comprises at least 80% w/w of the aqueous, metal ion formate salt composition of this invention and 20% w/w residual water. In certain embodiments, the residual film comprises at least 90% w/w of the aqueous, metal ion formate salt composition of this invention and 10% w/w residual water. In certain embodiments, the residual film comprises at least 95% w/w of the aqueous, metal ion formate salt composition of this invention and 5% w/w residual water. In certain embodiments, the residual film comprises at least 99% w/w of the aqueous, metal ion formate salt composition of this invention and 1% w/w residual water. Of course, for other pipeline materials, the film make up can vary, but generally it will be within these ranges. Of course, the final make up of the residual film coating the pipeline will depend on operating conditions and is adjusted so that the water content is below a dew point of pure water under the operating conditions.

The term "formate" means the salt of formic acid $HCOO^-$.

The term "metal ion formate salt" means the salt of formic acid $HCOOH^-M^+$, where $M^+$ is a metal ion.

The term "sub-freezing temperature" means a temperature below the freezing point of pure water.

DETAILED DESCRIPTION OF THE INVENTION

The inventors have found that a new fluid can be formulated for use in pipeline dewatering, conditioning, pressuring testing, and/or sub-freezing temperature testing operations, where the new fluid is capable of being used without environmental consideration. The new fluid includes an aqueous solution including a metal ion formate. These solutions are well suited for pipeline dewatering operations, pipeline repair operations, pipeline pressure testing operations, pipeline conditioning operations, pipeline hydrotesting operations or other pipeline operations without being concerned with collecting and disposing of the fluid as is true for competing fluids such as glycol containing fluids or alcohol containing fluids. The new fluid is also especially well suited for sub-freezing temperature operations.

The inventors have found that metal ion formate solutions such as potassium formate, marketed as Superdry 2000 by Weatherford International, is an alternative for many pipeline water removal or sub-freezing temperature applications. The formate solutions have similar conditioning properties to currently used fluids such as methanol and glycols, without the hazards associated with methanol and glycols. Formate solutions, such as potassium formate solutions, are known to be non-toxic and suitable for discharge directly into marine environments, without further processing. The ability to discharge formate solutions directly into marine environments is of particular benefit as it avoids the handling of typically large volumes of methanol or glycol containing fluids. In addition, metal ion formates lower the freezing point of water so that these solutions are suitable for use in low temperature applications, where freeze point suppression is needed, e.g., pressure testing or hydrotesting pipelines when the ambient temperature is below the freezing point of water or other sub-freezing temperature pipeline operations.

Metal ion formate salts, such as potassium formate, are very soluble in water forming a brine system, especially a concentrated brine system, with unique fluid properties. These properties include (1) a low viscosity, (2) a high density, (3) a low metals corrosivity, (4) low volatility, (5) a low solubility in hydrocarbons, (6) readily biodegradable, (7) a low toxicity, (8) nonhazardous, (9) a low environmental impact, (10) a freezing point depression property forming water/formate eutectic point mixtures, and (11) a water-structuring and water activity modification property.

The inventors have found that metal ion formate salts are soluble in water up to their saturation point, which is about 75% w/w in water for potassium formate. Metal ion formate salt solutions, including from about 5% w/w of a metal ion formate salt to water up to a saturated or supersaturated aqueous solution of the metal ion formate salt solutions, are well suited as powerful hydrate inhibitors comparable to conventional inhibitors. Of course, the concentration of the brine system needed for any given application will depend on the operation being undertaken or on the sub-freezing temperature operation being undertaken.

Potassium formate solutions display similar low viscosities as monoethylene glycol. Potassium formate solutions have low hydrocarbon solubility and have a specific gravity of about 1.57. Thus, in a two-phase system, metal ion formate salt solutions will more readily migrate with the heavier aqueous phase than compared with inhibitors such as methanol and glycol, which have substantial solubilities in hydrocarbons.

With an alkaline pH in the range of 10, concentrated metal ion formate salt solutions exhibit very low corrosivity to metals, while hydrocarbons and hazardous volatile organics have a very low solubility in the concentrated formate solutions at high pH, further reducing the corrosive effects of such organics, which often cause corrosive problems in other aqueous fluids, which tend to absorb the volatile compounds such as carbon dioxide, hydrogen sulfide, thiols, sulfides, hydrogen cyanide, etc.

Although not all metal ion formate salt solutions have been toxicity tested, potassium formate solutions are categorized as nonionic, non flammable and are rated nonhazardous for transport and handling purposes. The nontoxic properties of potassium formate solutions extend to aquatic organisms, where these solutions are readily biodegradable in dilute solution or acts as a biostat in concentrated solutions. Thus, the formulations of this invention have an OCNS Category E rating in Europe.

Potassium formate solutions have been subject to *Mysidopsis bahia* and *Menidia beryllina* larval survival and growth toxicity testing in an 800 mg/L control solution. Both microorganisms passed the normality tests at this concentration. The toxicity limit for subsea fluids in the OCS General Permit (GMG 290000) requires the survival NOEC to be ≧50 mg/L. The testing performed was an order of magnitude, i.e., 16 times greater than the permit requirements.

Further, metal ion formate salt solutions display similar eutectic properties to glycol-water solutions. For example, a 50% w/w solution of potassium formate in water has a freezing point of around −60° C.

It is common practice to condition deepwater pipelines using fluids such as glycols or methanol. The former is more common because it does not have the safety issues associated with the low vapor pressures of methanol. Such fluids are used to mitigate the risk of forming methane hydrates during startup operations. Methane hydrates form under certain pressure and temperature conditions. In deepwater systems, these conditions can exist at the extremities of the pipeline. High well head operating pressures and low subsea temperatures are perfect conditions for the creation of hydrates. Thus, it is common practice to heavily dose the tree with methanol or glycol during startup as a mitigating measure in the prevention of hydrate formation. This dosing is typically performed in conjunction with a chemical swabbing dewatering operation, and provides the pipeline with adequate protection throughout the system to prevent the formation of hydrates. However, dosing during startup on a pipeline system that has been “bulk dewatered” (i.e., unconditioned with chemicals) can still result in the formation of a hydrate. Hydrate formation in this setting is due to the initial adiabatic drop in pressure occurring across the well in conjunction with a high flowrate, and thus, methane gas may come into contact with free water further upstream of the chemical injection point. In such instances hydrates may form.

Many operators wish to avoid the use of hydrocarbon-based chemistry for this application, but as a general rule these systems are widely used due to lack of viable alternatives. The metal ion formate salt solutions of this invention provide the operators with an environmentally friendly, viable alternative with the added benefit that hydrate formation is mitigated during startup operations. Further, the metal ion formate salt solutions of this invention are also more cost effective than traditional fluids, because capture and subsequent disposal of the treating fluid is not required. The metal ion formate salt solutions can be discharged overboard in accordance with the relevant MMS permits.

Thus, the present invention also provides a method for conditioning deepwater pipelines comprising the step of filling the pipeline with an aqueous composition including an effective amount of a metal ion formate salt, where the effective amount is sufficient to reduce gas hydrate formation, especially methane hydrate formation.

The metal ion formate salt compositions of this invention are ideally suited for replacing traditional chemicals used in pig dewatering operations such as methanol and glycols, which have toxicity issued and must be treated or recovered. In dewatering operations, a pig or a pig train, where a pig train includes at least two pigs. In pig trains, the dewatering operation also includes at least one slug of a pipeline residual water film treatment introduced between at least two adjacent pigs. The lead pig or pigs push out the bulk water in the pipeline. However, remaining on the surface of the pipeline interior wall is a film of water. The film thickness will vary depending on the type of metal used to make the pipeline and on the tolerance of the pig-pipeline match. The slug of treatment is adapted to reduce or eliminate the water film or to replace the film with a film comprising at least 70% w/w of a formate salt composition of this invention. Other embodiments of film composition are listed above. The pig train can include a number of pigs with a number of treatment slugs traveling with the train between adjacent pigs. In certain embodiments, at least two slugs of treatment are used. The first treatment slug changes the film make up and pulls out excess water, while subsequent slugs dilute the film make up to a desired low amount of water. As set forth above, the low amount of water is less than about 30% w/w with the formate salt composition comprising the remainder. In other embodiments, the low amount of water is less than about 20% w/w. In yet other embodiments, the low amount of water is less than about 10% w/w. In still other embodiments, the low amount of water is less than about 5% w/w. It should be recognized that in actuality the formate solution is being diluted by the water and the film is becoming a diluted formate salt film. However, the goal of these treatments is to change the film composition sufficiently to reduce a dew point of the remaining water in the film below a dew point of water or seawater at the operating conditions. Therefore, the amount of formate composition will be sufficient to achieve this desired result. Of course, the amount of formate composition needed will also depend on the initial concentration of formate salt in the composition. In many dewatering embodiments, the initial formate composition will be a saturated or slightly supersaturated formate composition, where the term slight supersaturated means that the composition contains about 0.1 to 5% formate salt in excess of the saturation concentration, where residual water will dilute the formate concentration into a saturated or sub-saturated formate composition.

Suitable Reagents

Suitable metal ions for use in this invention include, without limitation, alkali metal ions, alkaline metal ions, transition metal ions, lanthanide metal ions, and mixtures or combinations thereof. The alkali metal ions are selected from the group consisting of $Li^+$, $Na^+$, $K^+$, $Rd^+$, $Cs^+$, and mixtures or combinations thereof. The alkaline metal ions are selected from the group consisting of $Mg^{2+}$, $Ca^{2+}$, $Sr^{2+}$, $Ba^{2+}$ and mixtures or combinations thereof. In certain embodiments, the transition metal ions are selected from the group consisting of $Ti^{4+}$, $Zr^{4+}$, $Hf^{4+}$, $Zn^{2+}$ and mixtures or combinations thereof. In certain embodiments, the lanthanide metal ions are selected from the group consisting of $La^{3+}$, $Ce^{4+}$, $Nd^{3+}$, $Pr^{2+}$, $Pr^{3+}$, $Pr^{4+}$, $Sm^{2+}$, $Sm^{3+}$, $Gd^{3+}$, $Dy^{2+}$, $Dy^{3+}$, and mixtures or combinations thereof.

Suitable metal ion formate salts for use in this invention include, without limitation, a compound of the general formula $(HCOO^-)_nM^{n+}$ and mixtures or combinations thereof, where M is a metal ion as set forth above and n is the valency of the metal ion.

Compositional Ranges

For dewatering applications, the general concentration range of metal ion formate salt in water is between about 40% w/w to saturation. In certain embodiments, the concentration range of metal ion formate salt in water is between about 45% w/w to saturation. In other embodiments, the concentration range of metal ion formate salt in water is between about 50% w/w to saturation. In other embodiments, the concentration range of metal ion formate salt in water is between about 55% w/w to saturation. In other embodiments, the concentration range of metal ion formate salt in water is between about 60% w/w to saturation. In other embodiments, the concentration range of metal ion formate salt in water is between about 65% w/w to saturation. In other embodiments, the concentration range of metal ion formate salt in water is between about 70% w/w to saturation. Of course one of ordinary art would understand that the concentration will depend on the required reduction in the amount of bulk and/or residual water left in the pipeline. In certain embodiments, the amount of metal ion formate salt in water can result in a supersaturated solution, where residual water in the pipeline will dilute the solution form supersaturated to saturated or below during the dewatering operation.

For sub-freezing pipeline applications, the general concentration range of metal ion formate salt in water is between about 5% w/w to saturation. In certain embodiments, the concentration range of metal ion formate salt in water is between about 15% w/w to saturation. In other embodiments, the concentration range of metal ion formate salt in water is between about 25% w/w to saturation. In other embodiments, the concentration range of metal ion formate salt in water is between about 35% w/w to saturation. In other embodiments, the concentration range of metal ion formate salt in water is between about 45% w/w to saturation. In other embodiments, the concentration range of metal ion formate salt in water is between about 55% w/w to saturation. In other embodiments, the concentration range of metal ion formate salt in water is between about 65% w/w to saturation. Of course, one of ordinary art would understand that the concentration will depend on the sub-freezing temperature needed for the application and the concentration can be adjusted dynamically to depress the freezing point to a temperature at least 5% below the sub-freezing operating temperature. In certain embodiments, the concentration of metal ion formate salt is sufficient to depress the freezing point to a temperature at least 10% below the sub-freezing operating temperature. In certain embodiments, the concentration of metal ion formate salt is sufficient to depress the freezing point to a temperature at least 15% below the sub-freezing operating temperature. In certain embodiments, the concentration of metal ion formate salt is sufficient to depress the freezing point to a temperature at least 20% below the sub-freezing operating temperature.

EXPERIMENTS OF THE INVENTION

Referring now to FIG. 1, a plot of methane hydrate suppression properties with methanol, ethylene glycol and potassium formate. The data shows that the potassium formate solution of this invention suppresses hydrate formation to an extent between ethylene glycol and methanol. Thus, the potassium formate solution of this invention is well suited for the suppression of methane hydrate in pipelines, especially during startup operations.

Figure 2:
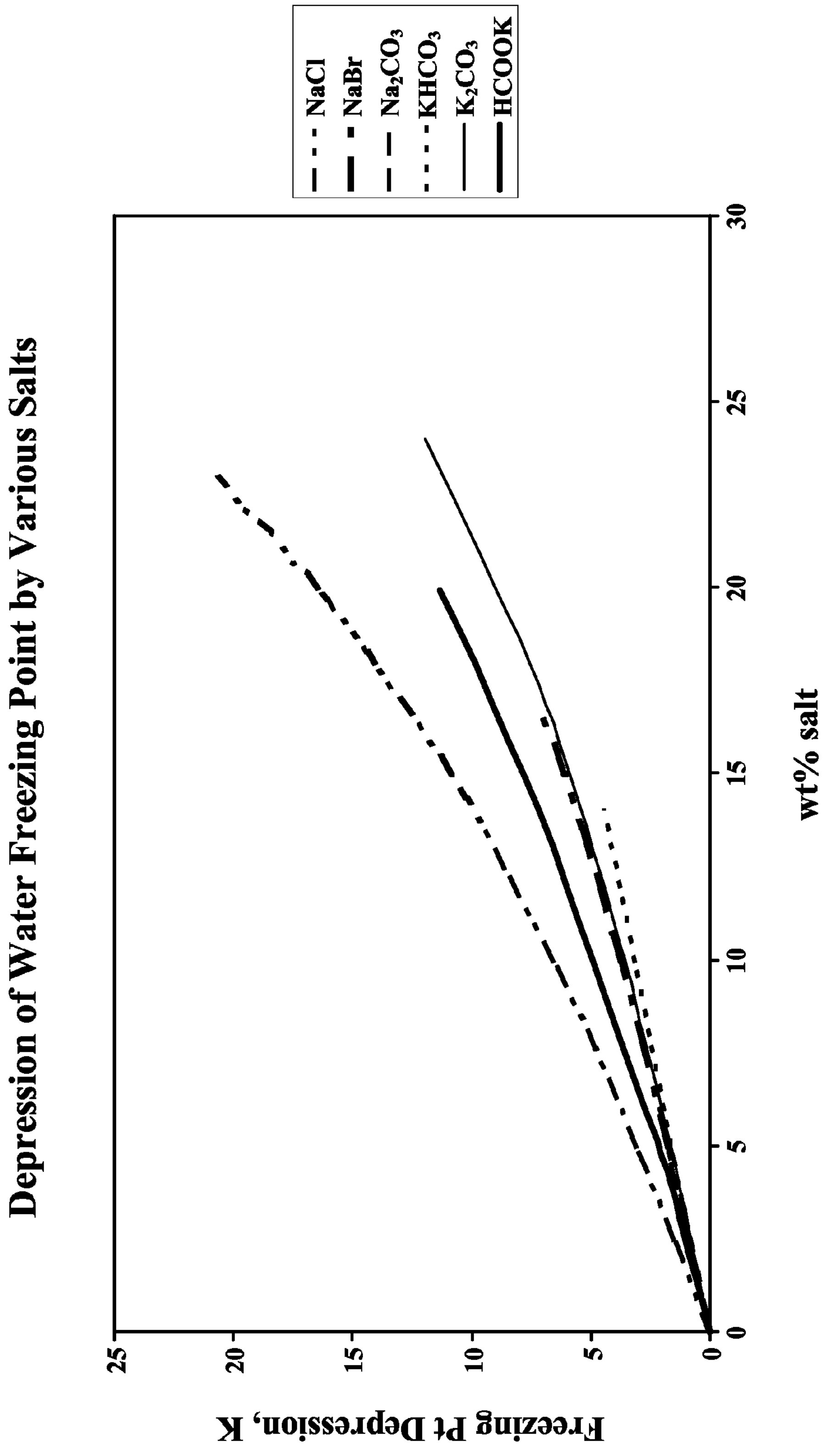
FIG. 2 depicts a plot of freezing point suppression versus salt concentration in wt. % for various salts including potassium formate.

Referring now to FIG. 2, a plot of freezing point suppression verses salt concentration in wt. % for various salts including potassium formate.

Figure 3:
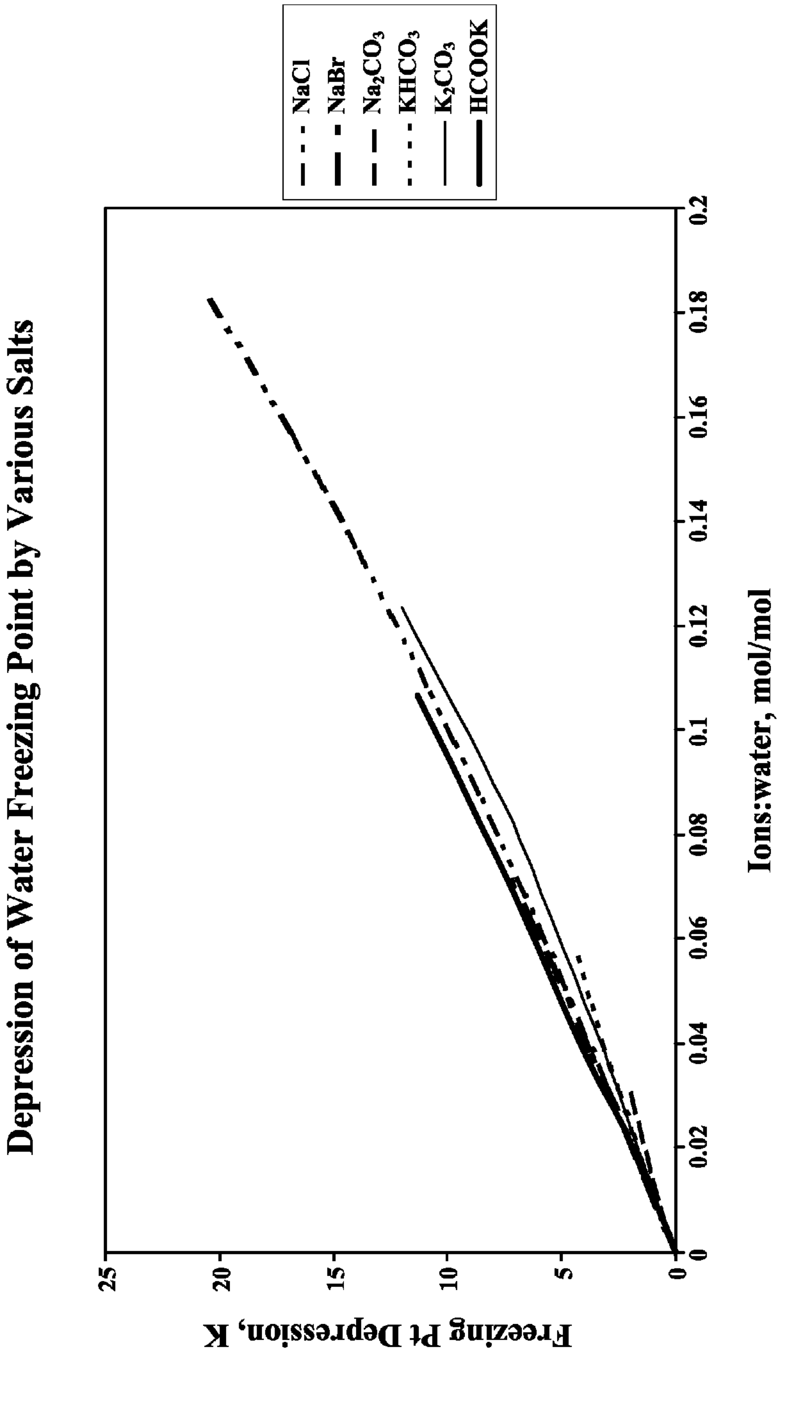
FIG. 3 depicts a plot of freezing point suppression versus salt concentration in ions:water, mol/mol for various salts including potassium formate.

Referring now to FIG. 3, a plot of freezing point suppression verses salt concentration in ions:water, mol/mol for various salts including potassium formate.

Figure 4:
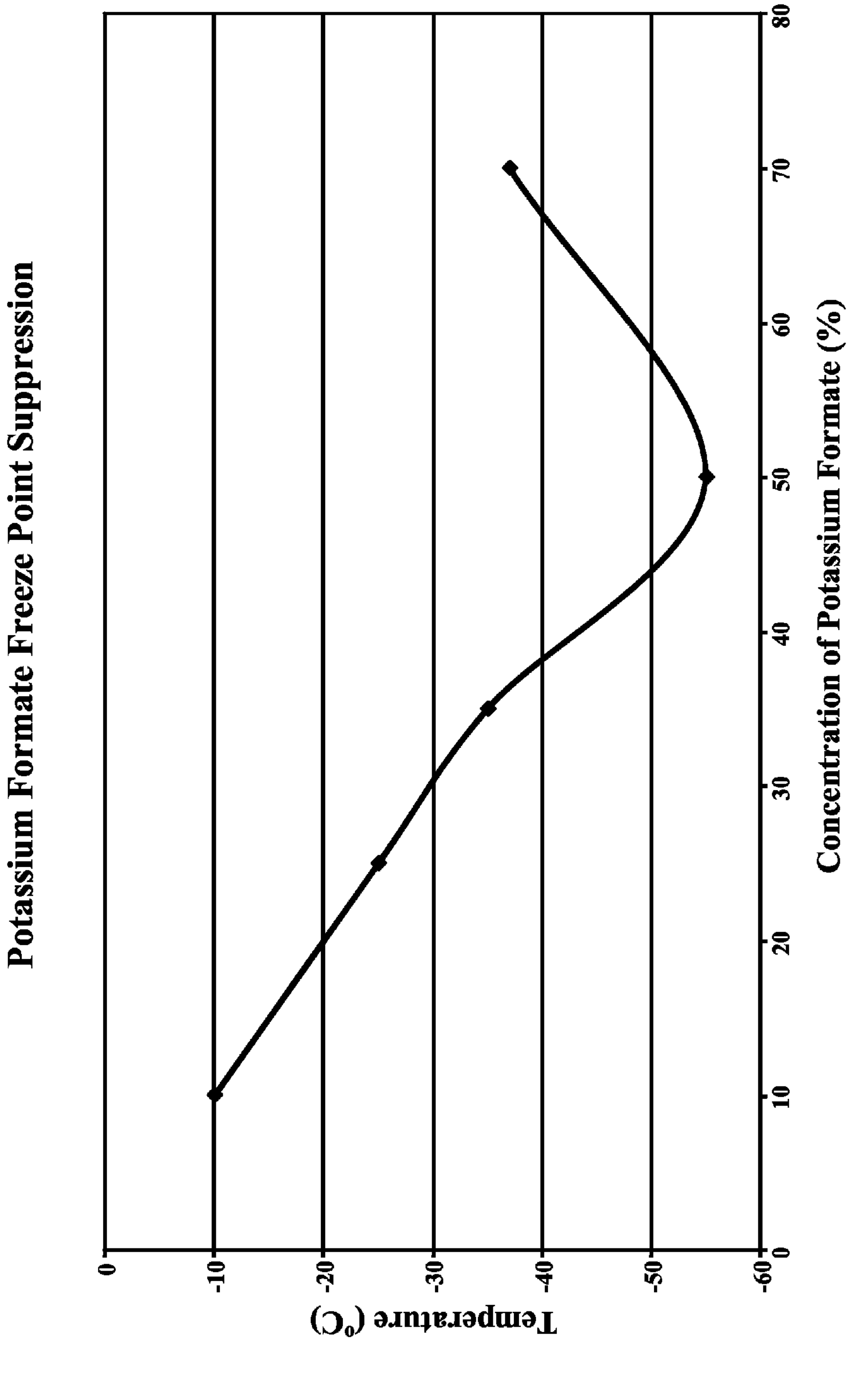
FIG. 4 depicts a plot of freezing point suppression versus various concentrations of potassium formate.

Referring now to FIG. 4, a plot of freezing point suppression verses various concentrations of potassium formate.

Figure 5:
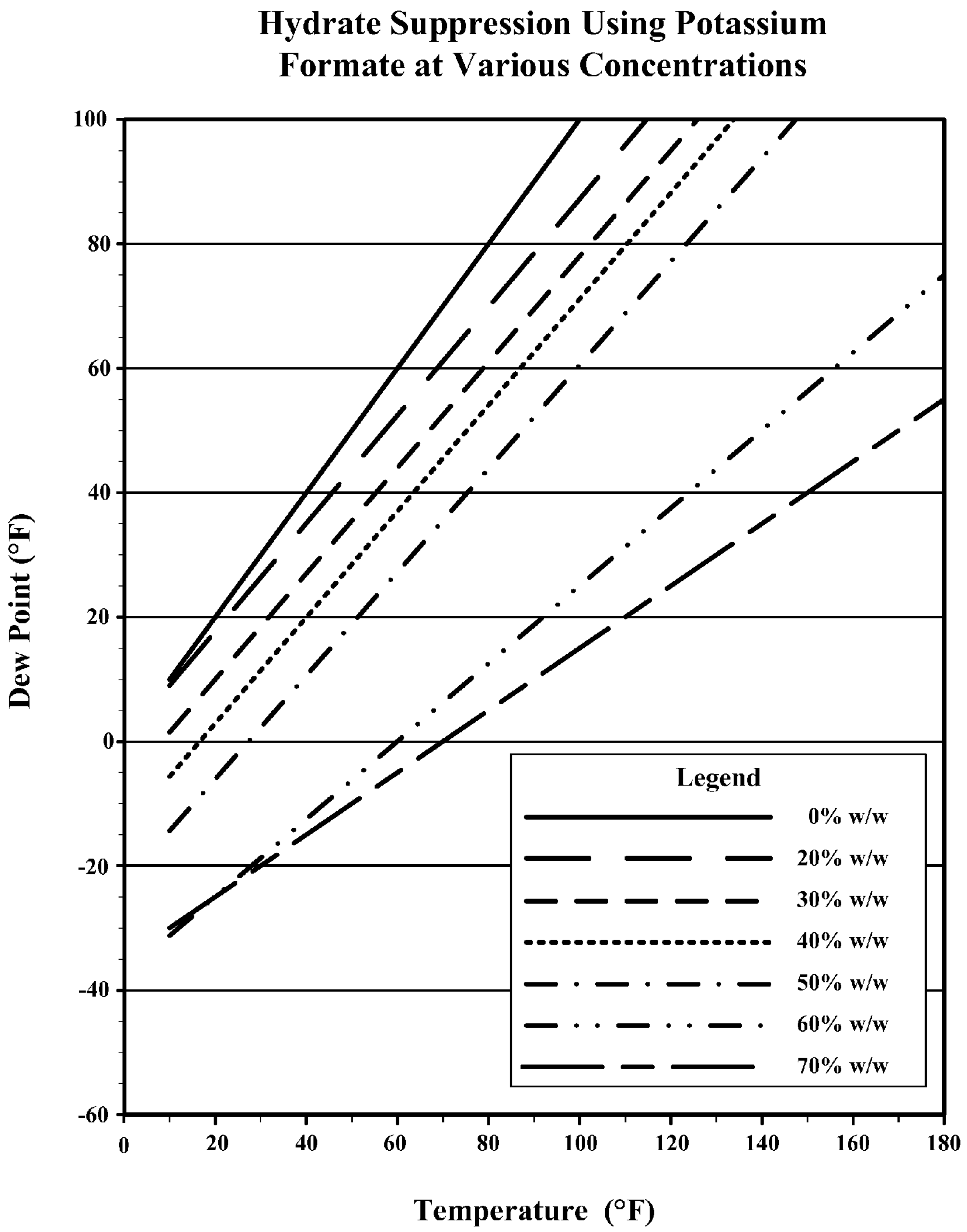
FIG. 5 depicts hydrate suppression using potassium formate at various concentrations.

Referring now to FIG. 5, a plot of hydrate suppression using potassium formate at various concentrations.

The above data clearly shows that metal ion formate salts are well suited for dewatering, testing, hydrotesting, hydrate suppression, and/or sub-freezing temperature pipeline operations.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for conditioning pipelines comprising the steps of:

filling a pipeline or portion thereof with a first aqueous composition including a first effective amount of a metal ion formate salt, pressurizing the pipeline to a desired test pressure, where the first effective amount is sufficient to reduce an amount of bulk water and/or an amount of residual water in the pipeline below desired amounts thereby suppressing gas hydrate formation and/or reducing a freezing point of the aqueous composition to a desired sub-freezing point temperature at the test pressure, and discharging the first aqueous composition directly into the environment without further processing or treatment after the pressurizing.

2. The method of claim 1, wherein the metal ion formate salt is a compound of the formula $(HCOO^-)_nM^{n+}$ and mixtures thereof, where M is a metal ion and n is the valency of the metal ion.

3. The method of claim 2, wherein the metal ion is selected from the group consisting of an alkali metal ion, an alkaline metal ion, a transition metal ion, a lanthanide metal ion, and mixtures thereof.

4. The method of claim 3, wherein the alkali metal ion is selected from the group consisting of $Li^+$, $Na^+$, $K^+$, $Rd^+$, $Cs^+$, and mixtures thereof.

5. The method of claim 4, wherein the alkali metal ion is $K^+$.

6. The method of claim 1, wherein the first effective amount is between about 5% w/w of metal ion formate salt to water and a saturation solution of the metal ion formate salt in water.

7. The method of claim 1, wherein the first effective amount is between about 25% w/w of metal ion formate salt to water and a saturation solution of the metal ion formate salt in water.

8. The method of claim 1, wherein the first effective amount is between about 45% w/w of metal ion formate salt to water and a saturation solution of the metal ion formate salt in water.

9. The method of claim 1, wherein the first effective amount is between about 65% w/w of metal ion formate salt to water and a saturation solution of the metal ion formate salt in water.

10. The method of claim 1, wherein the desired test pressure is a percentage of a maximum allowable operating pressure.

11. The method of claim 1, wherein the desired test pressure is a percentage of a pipeline design pressure.

* * * * *